US011880150B2

(12) United States Patent
Mitsuoka

(10) Patent No.: US 11,880,150 B2
(45) Date of Patent: Jan. 23, 2024

(54) FIXING DEVICE AND IMAGE FORMING APPARATUS

(71) Applicant: SHARP KABUSHIKI KAISHA, Osaka (JP)

(72) Inventor: Tetsunori Mitsuoka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/747,228

(22) Filed: May 18, 2022

(65) Prior Publication Data

US 2022/0397848 A1 Dec. 15, 2022

(30) Foreign Application Priority Data

Jun. 11, 2021 (JP) ................................ 2021-097933

(51) Int. Cl.
*G03G 15/20* (2006.01)
*G03G 15/00* (2006.01)

(52) U.S. Cl.
CPC ..... *G03G 15/2039* (2013.01); *G03G 15/2064* (2013.01); *G03G 15/5004* (2013.01)

(58) Field of Classification Search
CPC ........... G03G 15/2039; G03G 15/2064; G03G 15/5004
See application file for complete search history.

(56) References Cited

U.S. PATENT DOCUMENTS

2011/0299868 A1* 12/2011 Ito ...................... G03G 15/2039 399/88
2021/0200125 A1* 7/2021 Harada .............. G03G 15/2042

FOREIGN PATENT DOCUMENTS

JP H10-162935 A 6/1998
JP 2002-268447 A 9/2002
JP 2004-191710 A 7/2004

* cited by examiner

*Primary Examiner* — Stephanie E Bloss
*Assistant Examiner* — Michael A Harrison
(74) *Attorney, Agent, or Firm* — ScienBiziP, P.C.

(57) ABSTRACT

A fixing device includes a fixing roller and a pressure roller provided in a rotatable manner, a heat source for heating the fixing roller, and a controller for controlling AC power supplied to the heat source. The fixing device fixes an unfixed image on a sheet held and conveyed by the fixing roller and the pressure roller. The controller causes a current to flow including current-carrying waveforms having different phase angles in half-wave units during preset control cycles.

8 Claims, 7 Drawing Sheets

FIXING DEVICE AND IMAGE FORMING APPARATUS

BACKGROUND OF THE INVENTION

Field of the Invention

The present disclosure relates to a fixing device for fixing unfixed images on sheets and an image forming apparatus.

Description of the Background Art

Conventional fixing devices used in electrophotographic image forming apparatuses, such as copiers and printers, pressurizes and heats a sheet on which a toner image that is not fixed (unfixed image) is formed to fix the toner image to the sheet. When high power is supplied to a heater installed in a fixing device, the inrush current becomes excessive, and voltage fluctuation flickers occur in the power supply system. To reduce this problem, some control methods for heaters use phase control.

A certain electrophotographic apparatus (image forming apparatus) includes a heater, an AC power supply, and a control means. When supplying power to the heater, the control to hold the current to the heater at a specified phase angle for a certain period of time and then hold the current at a phase angle larger than the specified phase angle for a certain period of time is repeated multiple times before turning on the heater completely. When turning off the power supplied to the heater, the control to hold the current to the heater at a specified phase angle for a certain period of time and then hold the current at a phase angle smaller than the specified phase angle for a certain period of time is repeated multiple times before turning off the heater completely.

A different image forming apparatus includes a heater, a fixing member, a temperature detection means, and a control means. The control means controls the phase of AC power in a soft-start manner when the heater is turned on, and after continuing the phase control at a predetermined duty ratio for a predetermined time, switches the control to half-wave control at the same duty ratio as the predetermined duty ratio.

A still different image forming apparatus includes a phase control means that presets a voltage-time variation line on the basis of an electrical resistance value of the heater when the heater is initially energized and outputs a phase control signal so that the voltage actually applied to the heater falls within a predetermined allowable voltage range, and a voltage application means that applies a voltage to the heater on the basis of the phase control signal.

In recent years, image forming apparatuses have been installed in a variety of locations, including offices, homes, and stores, where voltage fluctuations synchronized with heater on/off can affect other installed equipment. For example, in lighting equipment (hereinafter referred to as "lighting"), voltage fluctuation can cause changes in luminance, which can cause discomfort to the user as flickering. In a control method with a set control cycle, voltage fluctuations occurs when the power is changed, such as when switching control cycles.

None of the above-mentioned technologies combines half-waveforms having adjusted phase angles during the control cycle, making it impossible to precisely adjust the amount of power supplied. The multiple use of waveforms having large phase angles leads to an increase in harmonic noise, and in particular, a large number of high-order harmonic components may cause serious effects such as malfunction or burnout of peripheral equipment.

An object of the present disclosure, which has been made to solve the above problem, is to provide a fixing device that and an image forming apparatus can freely adjust the amount of power to be supplied.

SUMMARY OF THE INVENTION

A fixing device according to an aspect of the present disclosure includes a fixing member and a pressure member disposed in a rotatable manner; a heat source that heats the fixing member; and a controller that controls AC power supplied to the heat source, wherein, the fixing device fixes an unfixed image on a sheet held and conveyed between the fixing member and the pressure member, and the controller causes a current to flow including current-carrying waveforms having different phase angles in half-wave units during preset control cycles.

In the fixing device according an aspect of the present disclosure, the controller may cause the current-carrying waveforms to be continuous at a joint between the control cycles adjacent to each other.

In the fixing device according an aspect of the present disclosure, the controller may cause the current-carrying waveforms to be continuous during the control cycles.

In the fixing device according to an aspect of the present disclosure, the current-carrying waveforms may be classified into one of a plurality of groups in which ranges of the phase angles are set without overlap, and the controller may provide a set in which the current-carrying waveforms belonging to different groups are made continuous with each other during the control cycles.

In the fixing device according to an aspect of the present disclosure, the phase angles of the current-carrying waveforms may be deemed to be low phase angles when 90 degrees or smaller, and a medium phase angle when greater than 90 degrees and 120 degrees or smaller, a high phase angle when greater than 120 degrees and smaller than 180 degrees.

In the fixing device according to an aspect of the present disclosure, the controller may set a difference between effective voltages of adjacent current-carrying waveforms to be a predetermined value or less at a joint between the control cycles adjacent to each other.

The fixing device according to an aspect of the present disclosure, the controller may control an effective voltage for each of the control cycles, and set a difference between an effective voltage for an entire current control cycle and an effective voltage for a next entire control cycle to a predetermined value or less.

An image forming apparatus according to an aspect of the present disclosure includes the fixing device according to an aspect of the present disclosure.

According to an aspect of the present disclosure, by including multiple current-carrying waveforms having different phase angles relative to each other in one control cycle, the amount of power supplied can be freely adjusted, and harmonic noise due to distortion of the waveforms can be suppressed while the occurrence of an extreme voltage difference is avoided.

DESCRIPTION OF THE PREFERRED EMBODIMENTS

In the following, an image forming apparatus and a fixing device according to an embodiment of the present disclosure is described with reference to the accompanying drawings.

Figure 1:
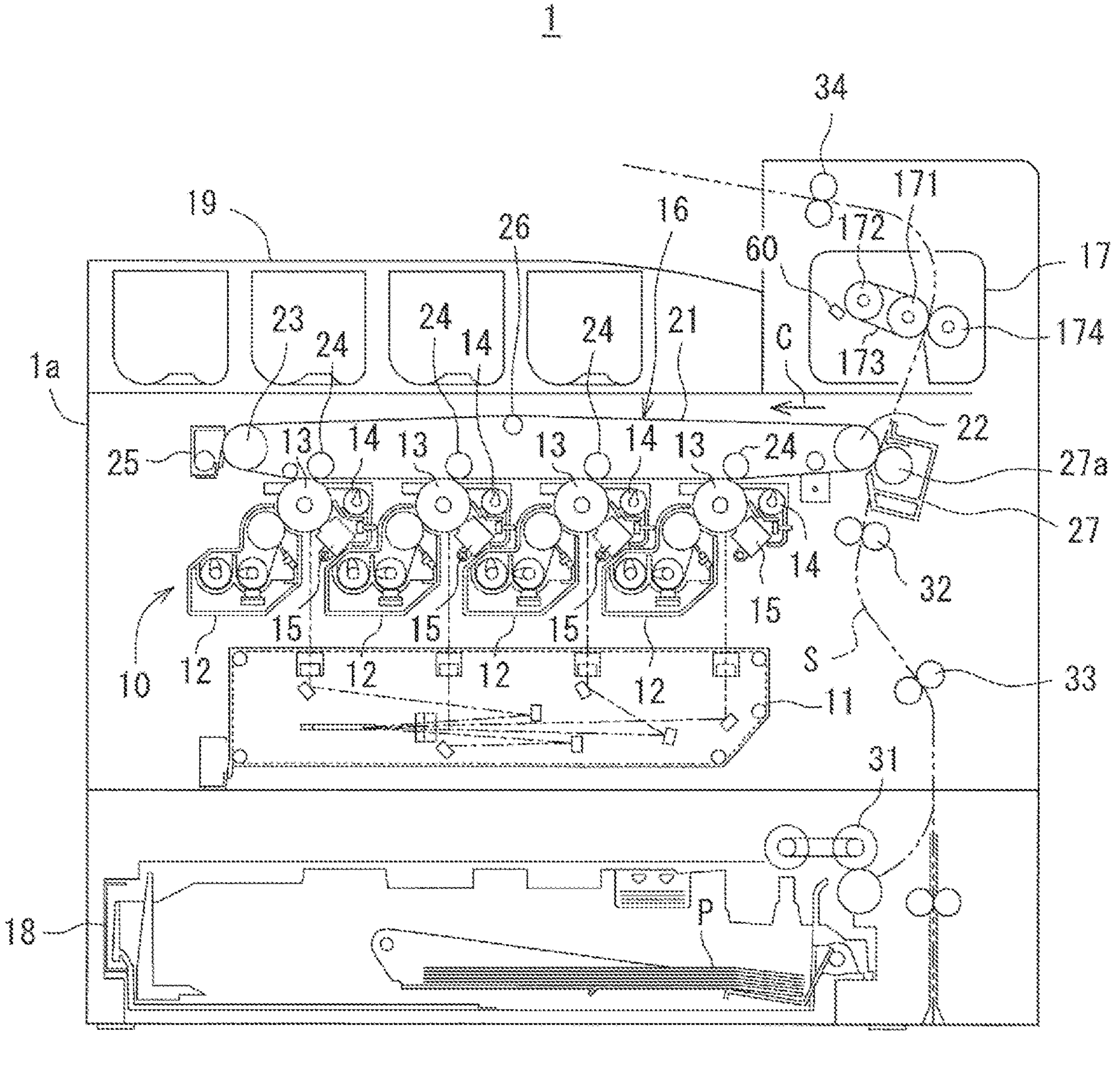
FIG. 1 is a schematic side view of an image forming apparatus according to an embodiment of the present disclosure.

FIG. 1 is a schematic side view of an image forming apparatus according to an embodiment of the present disclosure.

An image forming apparatus 1 forms multicolor and monochromatic images on a predetermined sheet in accordance with image data transmitted from an external device. The image forming apparatus 1 includes an exposure device 11, a developing device 12, a photoconductor drum 13, a cleaner device 14, a charger 15, an intermediate transfer belt device 16, a fixing device 17, a sheet feed cassette 18, and a sheet output tray 19.

The image data, which is dealt with in the image forming apparatus 1, is image data corresponding to the color image, for which four colors of black (K), cyan (C), magenta (M), and yellow (Y) are used. Thus, four each of the developing devices 12, the photoconductor drums 13, the chargers 15, and the cleaner devices 14 are provided so as to form four types of latent images according to the respective colors. In particular, the set colors are black, cyan, magenta, and yellow, respectively. As a result, four image stations are formed.

The photoconductor drums 13 are arranged almost in a center of the image forming apparatus 1. The chargers 15 uniformly charge the surfaces of the photoconductor drums 13 to a predetermined potential. The exposure devices 11 expose the surfaces of the photoconductor drums 13 so as to form electrostatic latent images. The developing devices 12 develop the electrostatic latent images on the surfaces of the photoconductor drums 13 so as to form toner images on the surfaces of the photoconductor drums 13. By a series of operations as above, toner images in the respective colors are formed on the surfaces of the respective photoconductor drums 13. The cleaner devices 14 remove and collect residual toner on the surfaces of the photoconductor drums 13 after the development and image transfer.

The intermediate transfer belt device 16 is arranged on an upper side of the photoconductor drums 13 and includes an intermediate transfer belt 21, an intermediate transfer belt driving roller 22, an intermediate transfer belt driven roller 23, intermediate transfer rollers 24, an intermediate transfer belt cleaning device 25, and a tension roller 26. There are four intermediate transfer rollers 24, which correspond to the image stations for the respective YMCK colors.

The intermediate transfer belt driving roller 22, the intermediate transfer belt driven roller 23, the intermediate transfer rollers 24, and the tension roller 26 are so formed as to allow the intermediate transfer belt 21 to be stretched on the rollers 22, 23, and 24 and move a surface of the intermediate transfer belt 21 in a specified direction (direction indicated by an arrow C in FIG. 1).

The intermediate transfer belt 21 runs in circles in the direction of the arrow C and is cleaned by the intermediate transfer belt cleaning device 25 so as to remove and collect residual toner, and the toner images in the respective colors as formed on the surfaces of the respective photoconductor drums 13 are sequentially transferred and superposed so as to form a color toner image on the surface of the intermediate transfer belt 21.

A nip area is formed between a transfer roller **27*a* of a secondary transfer device 27 and the intermediate transfer belt 21, and the transfer roller 27*a* catches a sheet P conveyed and arrived through the sheet conveyance path S in the nip area and conveys the sheet. The toner image on the surface of the intermediate transfer belt 21** is transferred onto a sheet P passing through the nip area.

The sheet feed cassette 18 is a cassette that stores sheets P used for image formation and is disposed under the exposure device 11. The sheet output tray 19 is provided in an upper portion of an image former **1*a*** as a tray that a sheet P with an image formed thereon is to be placed on.

In the image forming apparatus 1, the sheet P in the sheet feed cassette 18 is fed through the sheet conveyance path S to the secondary transfer device 27 and the fixing device 17, and then sent to the sheet output tray 19. Along the sheet conveyance path S, a sheet feed roller 31, a registration roller 32, a pre-registration roller 33, the fixing device 17, and a sheet output roller 34 are further disposed.

The sheet feed roller 31 is provided near the end of the sheet feed cassette 18, picks up a sheet P one by one from the sheet feed cassette 18, and supplies the sheet P to the sheet conveyance path S. The registration roller 32 temporarily holds the sheet P being conveyed from the sheet feed cassette 18 and conveys the sheet P to the transfer roller **27*a* at a timing that aligns the tip end of the toner image on the photoconductor drum 13 with the tip end of the sheet P. The pre-registration roller 33** is a small roller for facilitating and assisting the conveyance of sheets P.

The fixing device 17 is of a belt-fixing type and consists of a plurality of rollers (in this case, a fixing roller 171 and a heating roller 172) and a fixing belt 173 (an example of a fixing member) wound around the plurality of rollers. The fixing belt 173 can transmit heat from the heating roller 172 to the fixing roller 171. In the fixing device 17, a pressure roller 174 (an example of a pressure member) presses against the fixing roller 171 via the fixing belt 173. In the fixing device 17, the sheet P with an unfixed toner image formed thereon is received, and the sheet P is caught and conveyed between the fixing belt 173 and the pressure roller 174. A temperature detector 60 is disposed in the vicinity of the fixing belt 173. The sheet P after fixing is output by the sheet output roller 34 onto the sheet output tray 19. The fixing device 17 will be detailed later with reference to FIG. 2.

In the present embodiment, although the fixing device 17 is a belt-fixing-type fixing device, it is not limited thereto, and the fixing device 17 may be of a type in which the fixing roller 171 directly pressed by the pressure roller 174, or a type in which the fixing belt 173 is pressed to the pressure roller 174 by a fixing pad that does not rotate in place of the fixing roller 171. In the former type, the above-mentioned fixing member corresponds to the fixing roller 171, and in the latter type, the fixing member corresponds to the fixing belt 173.

The fixing device according to an embodiment of the present disclosure will now be described with reference to the accompanying drawings.

Figure 2:
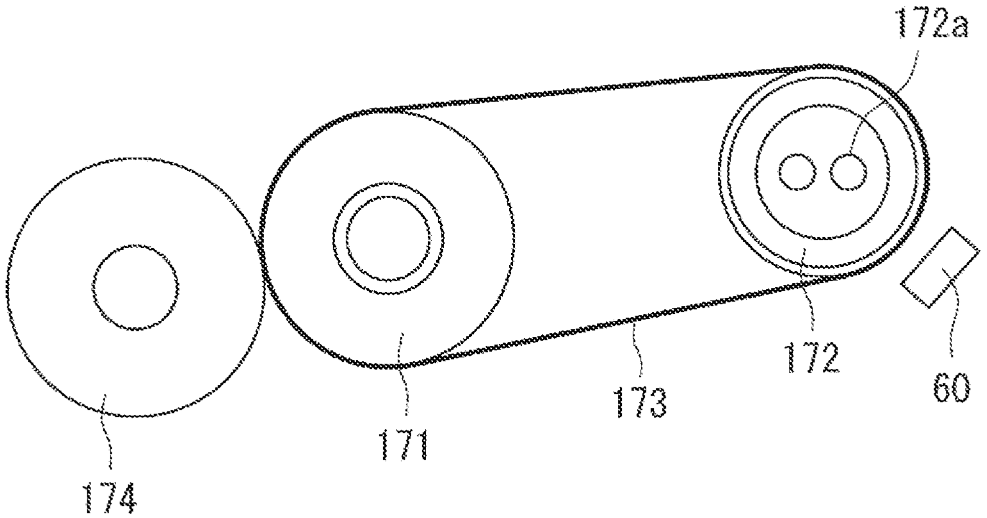
FIG. 2 is a schematic side view of a main portion of a fixing device.

FIG. 2 is a schematic side view of a main portion of a fixing device. FIG. 1 is a front view of the image forming apparatus 1, while FIG. 2 is a rear view of the image forming apparatus 1, so the left and right are reversed in these drawings.

In the present embodiment, the pressure roller 174 can be switched between an attached state in which the pressure roller 174 is pressed against the fixing roller 171 and a detached state in which the pressure roller 174 is detached from the fixing roller 171. The heating roller 172 houses a heat source 172*a*, such as a heater. The heat emitted by the heat source 172*a* heats the heating roller 172 and the fixing belt 173. The fixing belt 173 is moved by the rotation of the fixing roller 171, and as result, the portion of the fixing belt 173 heated by the heat source 172*a* gradually changes to heat the entire fixing belt 173. The temperature detector 60 is a non-contact temperature sensor and is disposed near the heating roller 172 facing the fixing belt 173.

Figure 3:
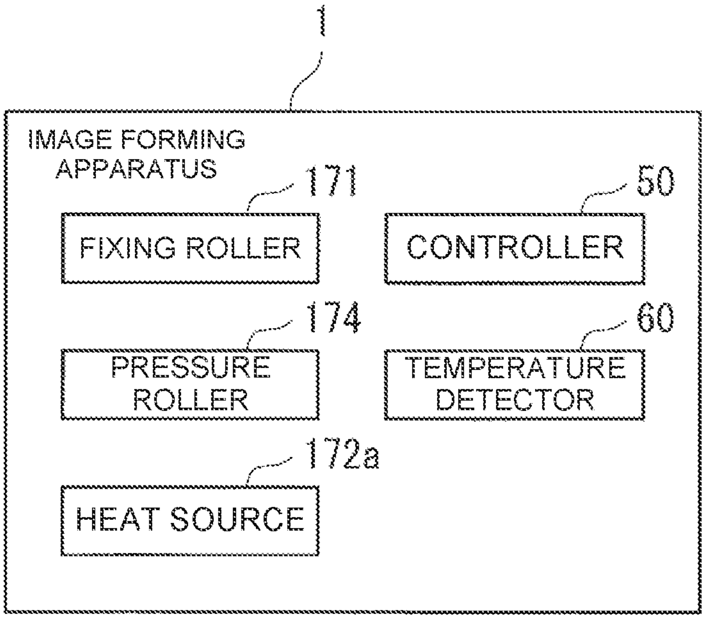
FIG. 3 is a schematic view of an image forming apparatus according to an embodiment of the present disclosure.

FIG. 3 is a schematic view of an image forming apparatus according to an embodiment of the present disclosure. FIG. 3 illustrates some components of the image forming apparatus 1 related to the fixing device 17. The image forming apparatus 1 may include other components that are not illustrated.

The image forming apparatus 1 includes the fixing roller 171, the pressure roller 174, the heat source 172*a*, the temperature detector 60, and a controller 50. The controller 50 controls the AC power supplied to the heat source 172*a*. The image forming apparatus 1 is supplied with AC power, like the lighting, from a power source used at an installation site, such as a typical home or office. The relationship between the AC power supplied to the image forming apparatus 1 and the lighting at the installation site will now be described with reference to FIG. 4.

Figure 4:
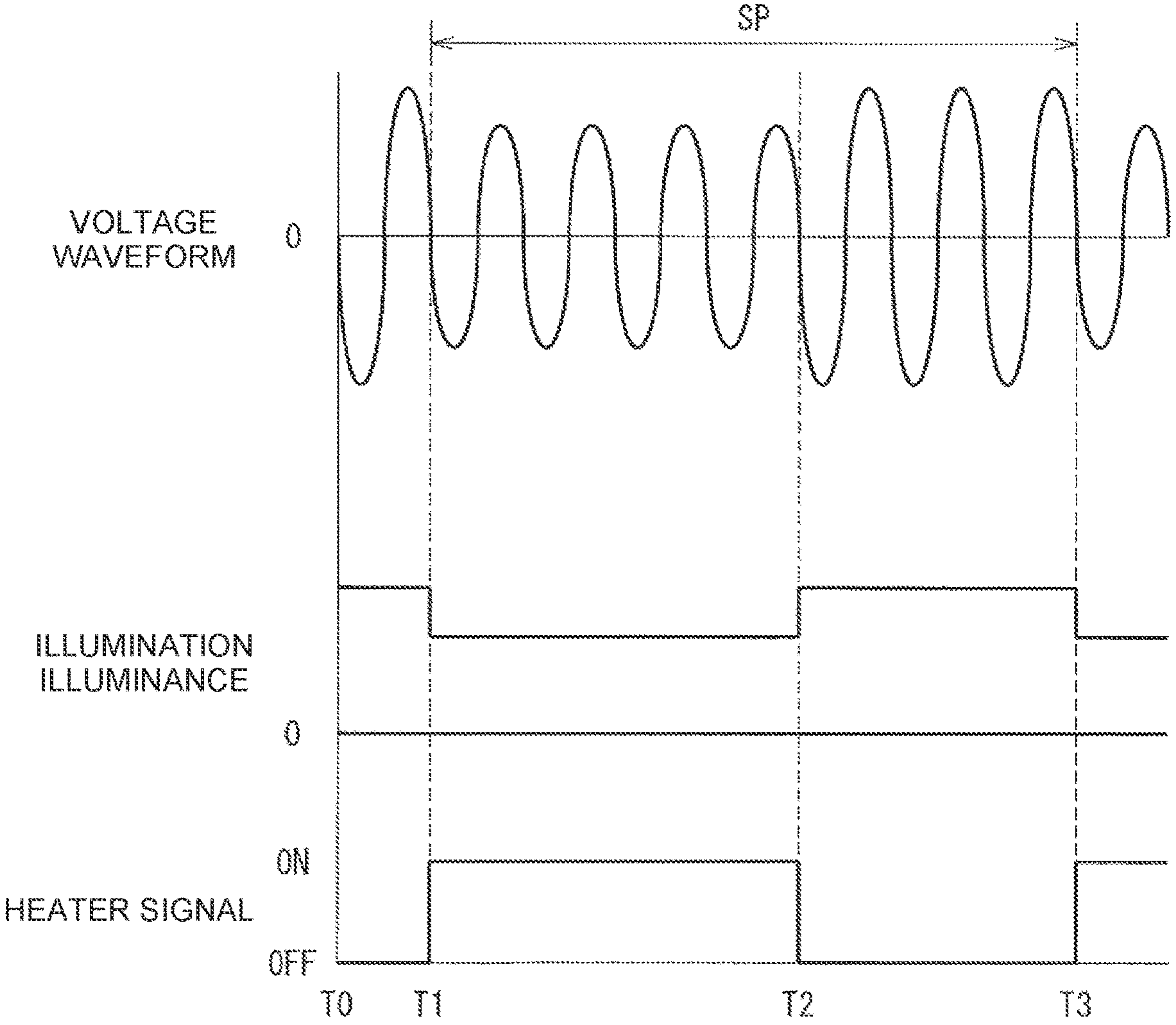
FIG. 4 is an explanatory view of the relationship between AC power supplied to the image forming apparatus and lighting at the installation site.

FIG. 4 is an explanatory view of the relationship between AC power supplied to the image forming apparatus and lighting at the installation site.

In FIG. 4, the voltage waveform corresponding to the AC power supplied to the image forming apparatus 1 is illustrated in the top section, the lighting luminance at the installation site is illustrated in the middle section, and the heater signal corresponding to an instruction from the controller 50 to the heat source 172*a* is illustrated in the bottom section. In FIG. 4, the horizontal axis represents the passage of time, and the vertical axis represents values corresponding to respective items. Specifically, the vertical axis represents an AC voltage value in the top section, and the value increases in the positive or negative direction as the distance from the reference line indicating zero increases. In the middle section, the luminance increases as the upward distance from the reference line, which indicates zero, increases. In the bottom section, the vertical axis represents the heater signal being turned on and off (switching between an on-state and an off-state).

In the period from time T0 to time T1, the voltage waveform has a great vibration in amplitude, the lighting luminance is high, and the heater signal is turned off. At time T1, the heater signal is turned on and remains on until time T2. With the heat source 172A turned on, the voltage drops, and the amplitude of the voltage waveform decreases. This also results in a lower lighting luminance. At time T2, the heater signal is turned off and remains off until time T3. Since the heater signal is turned off during the period from time T2 to time T3, the state is the same as that during the period from time T0 to time T1, and the lighting luminance becomes high. Then at time T3, the heater signal is turned on and returns to the same state as that at time T1. In other words, a control cycle SP is repeated from time T1 to time T3.

In the image forming apparatus 1, it is desirable to maintain the fixing roller 171, etc. at a desired temperature during image formation, and the heat source 172*a* periodically emits heat. As the heat source 172A is repeatedly turned on and off, changes in luminance occurs, i.e., the lighting becomes darker and brighter. Although the level of discomfort brought by such a change in luminance varies depending on the type of lighting, the lighting system, the power source environment, the reflection conditions of walls, ceilings, floors, etc., surrounding the lighting, arrangement conditions of people and the lighting with respect to each other, and individual differences, the human eye often feels intense flickering when the luminance changes by 400 lux or more in a short time, depending on the cycle of change in luminance. In contrast, a change in luminance by 100 to 200 lux hardly causes any discomfort. Therefore, in the image forming apparatus 1, phase control is performed to reduce the voltage fluctuation so that the change in luminance is small enough not to cause discomfort.

Figure 5:
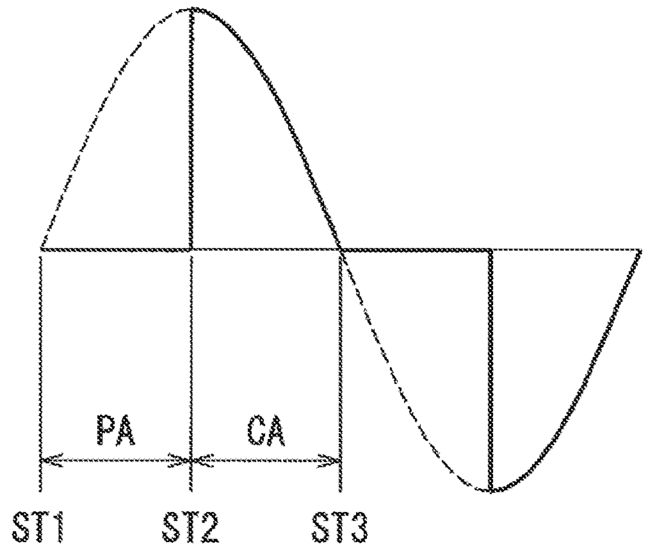
FIG. 5 is an explanatory view of the variation in voltage under phase control.

FIG. 5 is an explanatory view of the variation in voltage under phase control.

In FIG. 5, as in the voltage waveform section illustrated in FIG. 4, the horizontal axis represents the passage of time, and the vertical axis represents the voltage value. For the AC power supplied to the image forming apparatus 1, the voltage gradually rises from a point (a zero-crossing point at time ST1 in FIG. 5) where the voltage becomes zero, reaches a maximum positive value (the point at time ST2 in FIG. 5), and then gradually falls, following in a sine wave pattern. The voltage then goes through the zero-crossing point (at time ST3 in FIG. 5), reaches the negative maximum value, and then rises again. In FIG. 5, the dashed line represents the change in voltage when the output is set to 100%, and the solid line represents the change in voltage under phase control. For the sake of explanation, the voltage waveform from one zero-crossing point (e.g., at time ST1) to the next zero-crossing point (e.g., at time ST3) may also be referred to as a half-waveform.

In phase control, the output voltage is controlled by varying the ratio of on-time in each AC power cycle. Specifically, in FIG. 5, time ST1 to time ST2 is deemed as the off time, and the voltage is zero. Time ST2 to time ST3 is deemed as the on-time, and the voltage varies in the same way as when the output is set to 100%. In the phase control illustrated in FIG. 5, the phase angle PA corresponds to the off-time with respect to the timing of switching from off to on. The conduction angle CA corresponds to the on-time. In FIG. 5, the phase angle PA is set at 90 degrees. In phase control, the voltage value is determined by the area of the period of on-time.

Figure 6:
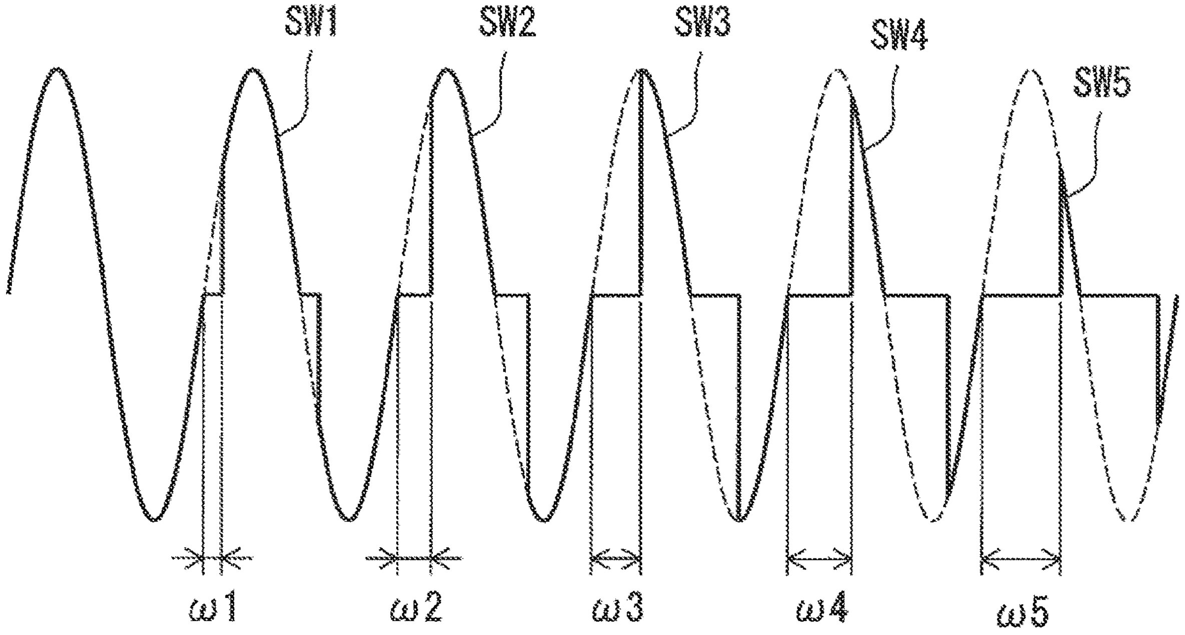
FIG. 6 is an explanatory view of the energizing pattern under phase control.

FIG. 6 is an explanatory view of the energizing pattern under phase control.

FIG. 6 illustrates an example of an energizing pattern under phase control, which is a voltage waveform with a varying phase angle PA. Among the energizing patterns illustrated in FIG. 6, five half-waveforms (first half-wave SW1 to fifth half-wave SW5) are described below. The phase angle (first angle ω1) of the first half-wave SW1 is 30 degrees, the phase angle (second angle ω2) of the second half-wave SW2 is 60 degrees, the phase angle (third angle ω3) of the third half-wave SW3 is 90 degrees, the phase angle (fourth angle ω4) of the fourth half-wave SW4 is 120 degrees, and the phase angle (fifth angle ω5) of the fifth half-wave SW5 is 150 degrees.

In the conventional image forming apparatus, the duty control may be performed when the output voltage is adjusted. The voltage waveform under duty control is described with reference to FIG. 7.

Figure 7:
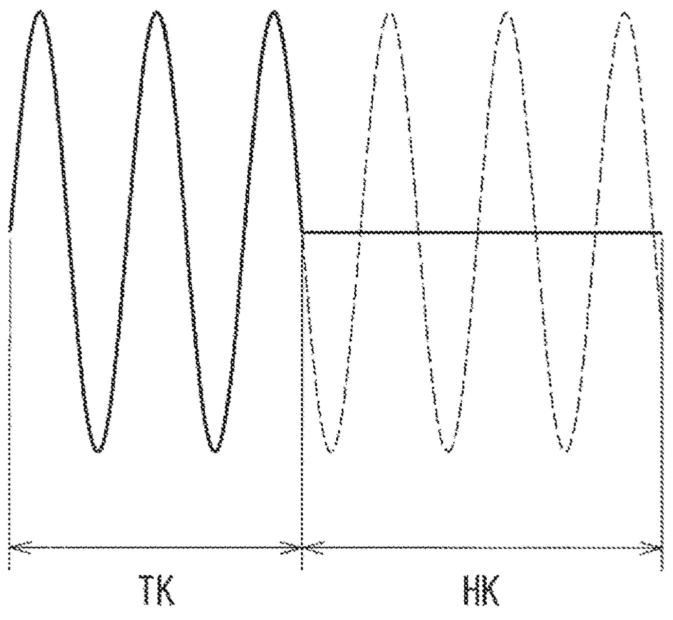
FIG. 7 is an explanatory view of the variation in voltage under conventional duty control.

FIG. 7 is an explanatory view of the variation in voltage under conventional duty control.

In the conventional duty control, one control cycle combining the energizing time TK and the non-energizing time HK is repeated. The energizing time TK is deemed to be the on-time, during normal AC power is supplied. The non-energizing time HK is deemed to be the off-time, during which the power supply is stopped. In duty control, the intensity of the output power is adjusted by changing the ratio of the energizing time TK to the non-energizing time HK. In other words, as the ratio of energizing time TK increases, the output increases, and as the ratio of non-energizing time HK increases, the output decreases.

Since conventional duty control switches between the energizing time TK and the non-energizing time HK, the voltage significantly increases or decreases, causing flickering of the lighting.

In contrast, the present disclosure reduces voltage fluctuation by incorporating phase control. First voltage control and second voltage control in the image forming apparatus according to the present embodiment of the present disclosure will now be described with reference to FIGS. 8 and 9.

Figure 8:
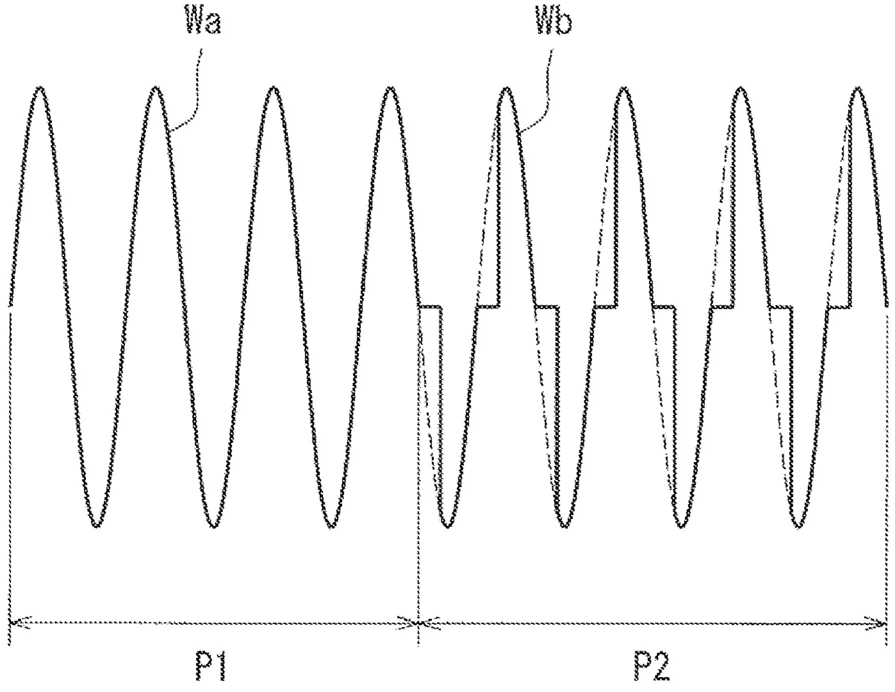
FIG. 8 is an explanatory view of an example of first voltage control of an image forming apparatus according to an embodiment of the present disclosure.

FIG. 8 is an explanatory view of an example of the first voltage control of an image forming apparatus according to an embodiment of the present disclosure.

In the first voltage control, one control cycle combining a full-wave time P1 and a phase control time P2 is repeated. During the full-wave time P1, the phase angle is zero degrees, and a full-wave Wa, which is always on-time, is output. Then, during the phase control time P2, a phase wave Wb having a predetermined phase angle is output. The phase angle of the phase wave Wb may be changed in accordance with the effective voltage of the phase control time P2, and as illustrated in FIG. 5, the effective voltage decreases when the phase angle is increased, and the effective voltage increases when the phase angle is decreased. During the phase control time P2, the phase angle of the phase wave Wb is presumed to be constant, but the phase angle of some phase waves Wb may be different.

In the image forming apparatus 1, the effective voltage in one control cycle is controlled by combining the full-wave time P1 and the phase control time P2, to determine the heating value of the heat source 172*a*. By performing continuous energization including current-carrying waveforms having different phase angles in half-wave units during the control cycle, the amount of power supplied can be freely adjusted, and harmonic noise due to distortion of the waveform can be suppressed while the occurrence of an extreme voltage difference is avoided. That is, in the present embodiment, since no non-energizing time HK during which no electric power is output is provided, unlike in conventional duty control, the heating value can be finely varied while the heat source 172*a* is continuously turned on.

The ratio of the full-wave time P1 to the phase control time P2 in one control cycle may be appropriately changed, and the phase angle may be adjusted accordingly. Specifically, a longer phase control time P2 can sufficiently reduce the effective voltage in the control cycle even with a smaller phase angle. When the phase angle is reduced, the waveform of the phase wave Wb approximates that of the full-wave Wa, which reduces waveform distortion and suppresses harmonic noise.

Figure 9:
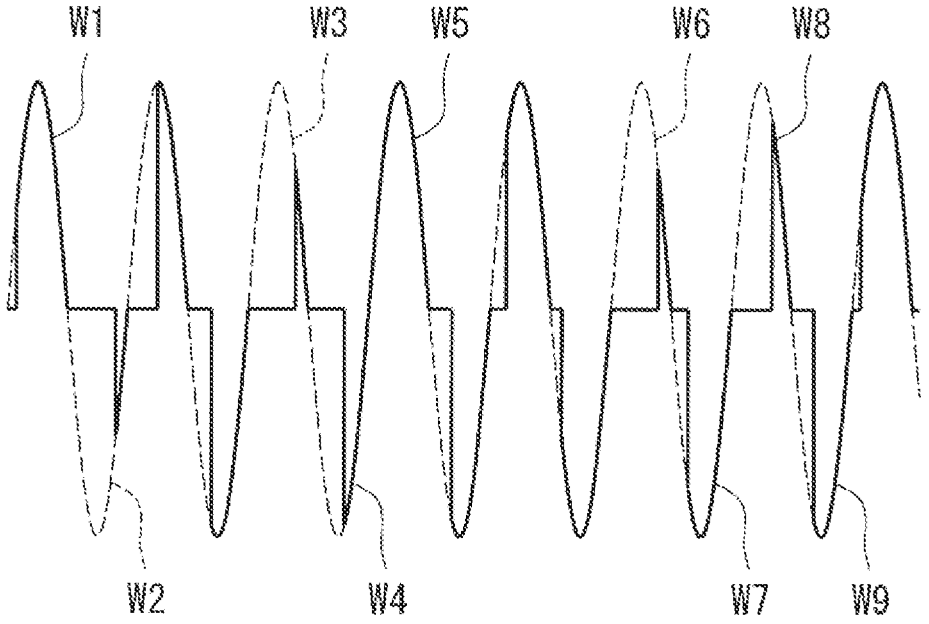
FIG. 9 is an explanatory view of an example of second voltage control of an image forming apparatus according to an embodiment of the present disclosure.

FIG. 9 is an explanatory view of an example of the second voltage control of an image forming apparatus according to an embodiment of the present disclosure.

Under the second voltage control, one control cycle in which a multiple half-waves having different phase angles are combined is repeated. In FIG. 9, the second wave W2 to the eighth wave W8 are in one control cycle. The first wave W1 is included in the previous control cycle and is deemed to be the half-wave immediately preceding the second wave W2. The ninth wave W9 is included the next control cycle and is deemed to be the half-wave immediately after the eighth wave W8.

In the present embodiment, multiple groups consisting of multiple divided ranges of phase angles are set so as not to overlap each other. The current-carrying waveform is classified into one of the groups in accordance with the range to which the phase angle belongs. Specifically, the phase angle of the current-carrying waveform (half-wave) is deemed to be a low phase angle when 90 degrees or smaller, and a medium phase angle when greater than 90 degrees and 120 degrees or smaller, a high phase angle when greater than 120 degrees and smaller than 180 degrees. A half-wave having a low phase angle is classified into a first group, a half-wave having a medium phase angle is classified into a second group, and a half-wave having a high phase angle is classified into a third group.

In the case of the example illustrated in FIG. 9, the first wave W1, the seventh wave W7, and the ninth wave W9 correspond to a low phase angle, the fourth wave W4 and the eighth wave W8 correspond to a medium phase angle, and the second wave W2, the third wave W3, and the sixth wave W6 are corresponds to a high phase angle. The fifth wave W5 is a full-wave having a phase angle PA set to zero degrees and corresponds to a low phase angle. The successive first wave W1 and second wave W2 correspond to a combination of a low phase angle and a high phase angle. The successive third wave W3, fourth wave W4, and fifth wave W5 correspond to a combination of a low phase angle, a medium phase angle, and a high phase angle. Under the second voltage control, a set of current-carrying waveforms that belong to different groups are provided continuously. Thus, by providing some difference in the phase angles of adjacent current-carrying waveforms, the amount of power can be set flexibly. The generation of harmonic noise can be avoided by avoiding continuous current-carrying waveforms with large phase angles. By making the current-carrying waveform continuous at the joints of control cycles and during the control cycle, it is possible to eliminate interruption in the flowing current and reduce voltage fluctuation.

Examples of combinations that are less likely to worsen harmonic noise include, besides those described above, "high phase angle+low phase angle", "high phase angle+medium phase angle", "low phase angle+medium phase angle", "low phase angle+high phase angle+medium phase angle", "low phase angle+high phase angle+low phase angle", and "medium phase angle+high phase angle+medium phase angle".

A control flow of the image forming apparatus will now be explained with reference to FIG. 10.

Figure 10:
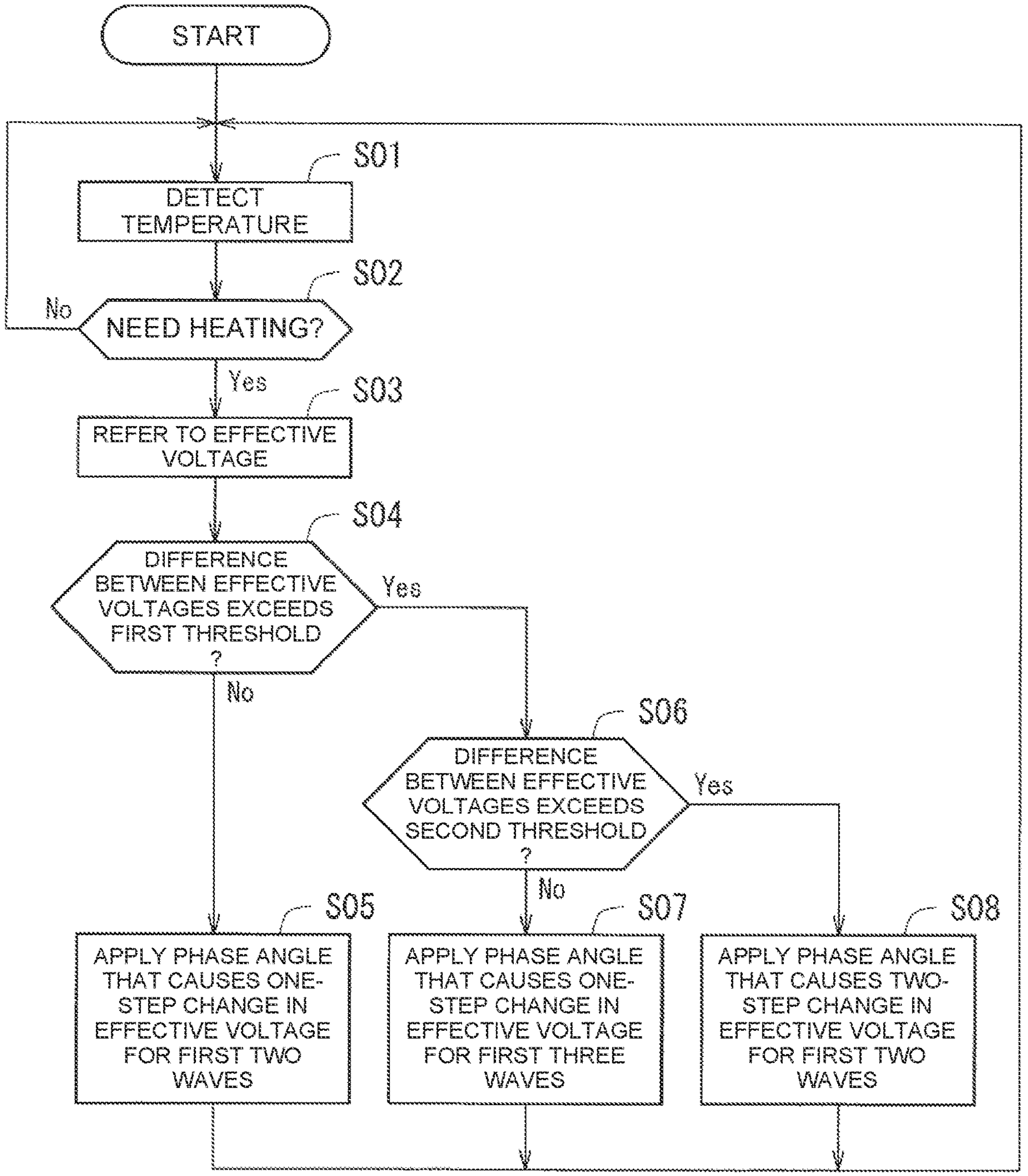
FIG. 10 is a flowchart illustrating a control flow for an image forming apparatus.

FIG. 10 is a flowchart illustrating the control flow for an image forming apparatus.

In step S01, the temperature detector 60 senses the temperature.

In step S02, the controller 50 determines whether or not heating is necessary on the basis of the sensing result of the temperature detector 60. The temperature of the heat source 172*a* may be controlled in consideration of the setting value and the rising speed, and may be adjusted appropriately so as not to cause overshoot. The controller 50 may determine the timing at which the control cycle is switched, or may control the temperature at predetermined intervals. If heating is necessary as a result of determination by the controller 50 (step S01: Yes), the process proceeds to step S03. If heating is not necessary (step S01: No), then the process returns to step S01.

In step S03, the effective voltage is referenced by the controller 50. For the effective voltage, the effective voltage of the entire previous control cycle or to the last half-wave in the previous control cycle may be referred to. For the next control cycle, the effective voltage is estimated on the basis of the heating value calculated by the controller 50.

In step S04, the controller 50 determines whether or not the difference between effective voltage of the previous control cycle and the effective voltage of the next control cycle exceeds a predetermined value, in this case, a first threshold. In the present embodiment, the first threshold value is set at 30 V. As a result, if the difference in the effective voltages exceeds the first threshold (step S04: Yes), then the process proceeds to step S06. If the difference in the effective voltages does not exceed the first threshold (step S04: No), then the process proceeds to step S05.

In step S05, he controller 50 applies a phase angle in which the effective voltage varies in one step for the first two half-waves (two waves) of the control cycle. The controller 50 changes the phase angle in steps for the first two half-waves of the control cycle. In other words, the controller 50 varies the voltage so that the phase angle changes in steps from the immediately preceding half-wave, to the first two half-waves, and to subsequent half-waves in that order. In this way, by reducing the voltage fluctuation by making the difference in the effective voltages of adjacent half-waves at the joint between the control cycles equal to or less than a predetermined value, it is possible to suppress the harmonic noise by combining current-carrying waveforms having patterns of phase angle combinations that do not increase the harmonic waves while suppressing the flickering of lighting. When the difference in the effective voltages is 30 V or less, the change in luminance is small under most conditions, depending on the type of lighting, and the change is only about 100 lux, so that flickering is hardly felt.

For voltage control, either the first voltage control or the second voltage control described above may be used, and in either case, the required effective voltage can be obtained by adjusting the phase angle of the half-wave. In the first voltage control and the second voltage control, a table with phase angles for the respective half-waves to be lit may be set in advance, and the controller 50 may select a phase angle corresponding to the heating value from the table. In the table above, the phase angles may be set so that the duty ratio varies in 1% increments.

In step S06, the controller 50 determines whether or not the difference between effective voltage of the previous control cycle and the effective voltage of the next control cycle exceeds a second threshold. In the present embodiment, the second threshold value is set at 60 V. As a result, if the difference in the effective voltages exceeds the second threshold (step S06: Yes), then the process proceeds to step S08. As a result, if the difference in the effective voltages does not exceed the second threshold (step S06: No), then the process proceeds to step S07.

In step S07, the controller 50 applies a phase angle in which the effective voltage varies in one-step for the first three half-waves (three waves) of the control cycle. The controller 50 changes the phase angle in steps for the first three half-waves of the control cycle. In other words, the controller 50 gradually varies the voltage so that the phase angle changes in steps from the immediately preceding half-wave, to the first three half-waves, and to subsequent half-waves in that order.

Specifically, when the difference in the effective voltages is 30 V or more and less than 60 V, the voltage fluctuation is large in one switching, but by increasing the wave number from two half-waves to three half-waves to smoothen the fluctuation, it becomes difficult to recognize flickering. That is, it is possible to switch, in steps, in units of several half-waves or blocks of multiple half-waves.

In step S08, the controller 50 applies a phase angle in which the effective voltage varies in two steps. The controller 50 changes the phase angle in steps for the first two half-waves of the control cycle. In other words, the controller 50 gradually varies the voltage so that the phase angle changes in steps from the immediately preceding half-wave, to one of the first two half-waves, the other one of the first two half-waves, and the subsequent half-waves.

After steps S05, S07, and S08, the process returns to step S01 and is repeated.

In steps S05, S07, and S08, the phase angles of the first two or three half-waves of the control cycle are changed in steps, but the change is not limited to this. Alternatively, the effective voltage may be changed in steps in control cycle units. That is, if the difference in the effective voltages between the current control cycle and the next control cycle exceeds a predetermined value, the difference in the effective voltages between the next control cycle and the immediately preceding control cycle is set to a predetermined value or less, and the subsequent control cycles are set to a desired effective voltage. That is, in the case of intense heating, the voltage fluctuation can be reduced while securing a sufficient heating value by heating in steps.

The embodiment disclosed herein is an example in all respects including numerical values and gives no grounds for a limited interpretation. The present disclosure can be applied not only to an image forming apparatus provided with a heat source but also to, for example, an air conditioner or a refrigerator provided with a lighting device and a compressor, as long as the apparatus requires AC power with a large power consumption. The present disclosure can be applied to the control of luminance in the case of a lighting device, and can be applied to the control of the capacity of a compressor, that is, the control of air conditioning intensity in the case of an air conditioner. Therefore, a technical scope of the present disclosure is not interpreted solely based on the embodiment as described above but is demarcated on the basis of the recitals in the claims. All modifications equivalent to the claims in meaning and scope fall within the scope of the present disclosure.

What is claimed is:

1. A fixing device comprising:

a fixing member and a pressure member disposed in a rotatable manner;

a heat source that heats the fixing member; and a controller that controls AC power supplied to the heat source, wherein, the fixing device fixes an unfixed image on a sheet held and conveyed between the fixing member and the pressure member, and the controller causes a current to flow including current-carrying waveforms having different phase angles in half-wave units during preset control cycles, and changes, in steps, the phase angles in half-waves immediately before a joint between control cycles, among the preset control cycles, that are adjacent to each other when a difference in effective voltages of adjacent current-carrying waveforms at the joint exceeds a threshold.

2. The fixing device according to claim 1, wherein the controller further causes the current-carrying waveforms to be continuous at the joint between the control cycles adjacent to each other.

3. The fixing device according to claim 1, wherein the controller further causes the current-carrying waveforms to be continuous during the preset control cycles.

4. The fixing device according to claim 1, wherein the current-carrying waveforms are classified into one of a plurality of groups in which ranges of the phase angles are set without overlap, and the controller further provides a set in which the current-carrying waveforms belonging to different groups are made continuous with each other during the preset control cycles.

5. The fixing device according to claim 4, wherein the phase angles of the current-carrying waveforms are deemed to be low phase angles when 90 degrees or smaller, deemed to be medium phase angles when greater than 90 degrees and 120 degrees or smaller, and deemed to be high phase angles when greater than 120 degrees and smaller than 180 degrees.

6. The fixing device according to claim 1, wherein the controller further sets the difference between the effective voltages of the adjacent current-carrying waveforms to be a predetermined value or less at the joint between the control cycles adjacent to each other.

7. The fixing device according to claim 1, wherein the controller further controls an effective voltage for each of the preset control cycles, and sets a difference between an effective voltage for an entire current control cycle and an effective voltage for a next entire control cycle to a predetermined value or less.

8. An image forming apparatus comprising the fixing device according to claim 1.

* * * * *